3,010,957
ETHINYL ANDROSTADIENES
Arthur Nobile, Livingston, N.J., assignor to Schering Corporation, Bloomfield, N.J., a corporation of New Jersey
No Drawing. Filed Nov. 26, 1958, Ser. No. 776,400
10 Claims. (Cl. 260—239.55)

This invention relates to a new group of therapeutically active steroid compounds. More particularly, this invention relates to certain 9α-halogeno-17α-ethinyl androstadienes and to methods for their preparation.

The compounds of the present invention can be represented by the following general formula:

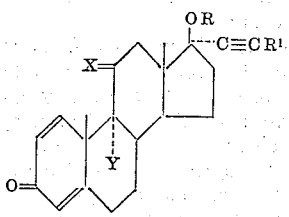

wherein R is selected from the group consisting of H and lower alkanoyl, $R^1$ is a member of the group consisting of H and lower alkyl, X is selected from the group consisting of O, and (H, βOH), and Y is a halogen having an atomic weight less than 100.

It has been found that the halogenated compounds of the above general formula are potent anti-inflammatory agents, possess a degree of catabolic and anti-anabolic activities and are indicated for use in conditions where anti-inflammatory and anti-anabolic agents have been employed, such as arthritis. The compounds of this invention are essentially free of androgenic and salt retaining effects.

The new compounds of the invention can be readily prepared by subjecting a 1,2-dihydro analog of a compound of the above formula to the action of a dehydrogenating microorganism whereby the starting compound is transformed into the 3-keto-$\Delta^{1,4}$-diene.

In the preferred procedure for the microbiological conversion there is employed as the modifying microorganism a member of the family Corynebactriaceae, which includes the genera Corynebacterium, Listeria and Erysipelothrix. However, other dehydrogenating microorganisms, for example, Bacillus sphaericus (American Type Culture Collection 7055), have been found to be capable of accomplishing the desired conversion. As best results have been obtained with Corynebacterium simplex, the alternate procedure will be further described mainly with particular reference to this organism but it will be understood that other dehydrogenating members of the family Corynebactriaceae can be employed in place of Corynebacterium simplex.

In order to obtain a desirable growth of, for example, Corynebacterium simplex (A.T.C.C. 6946) for the process of this invention, a suitable nutrient medium is prepared containing carbohydrate, organic nitrogen, cofactors, and inorganic salts. It is possible to omit the use of carbohydrates without completely impairing the growth of the organism. The steroid compound, in the solid condition or dissolved or suspended in a water-miscible solvent which is non-toxic toward the organism, is added to the cultivated microorganism in a broth medium under sterile conditions. This culture is then shaken, aerated or simultaneously aerated and agitated, in order to enhance the growth of the microorganism and the biochemical conversion of the steroid substrate. The steroid may be added to the broth medium and then inoculated with the bacterium, or the cultivated microorganism in broth medium may be added to the steroid. In certain cases, depending on the condition of the reaction medium, it may be more desirable to obtain optimum growth of the microorganism before the addition of the steroid. Alternatively, enzyme preparations obtained in known manner from cultures of microorganism may be used in my process.

In carrying out my process, the bacterium, such as Corynebacterium simplex, is cultivated in a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (N-Z-Amine) (type B Sheffield), corn steep liquor, water extract or soybean oil meal, lactalbumin hydrolysate (Edamine—Sheffield enzymatic), fish solubles, and the like.

Inorganic salts are desirable to maintain a pH level in the reaction medium of between 6.8 and 7.2, but the use of such salts for buffering the reaction mixture may be omitted. The omission of inorganic salts causes the pH to rise from an initial value of 6.8 to about 7.7–8. This, however, will still permit the formation of the desired steroidal end products. The optimum temperature for growth of the selected microorganism is 37° C., but the temperatures may vary between 25° and 37° C., and even between 20° and 40° C. The time of reaction may vary from as little as 3 hours to as much as 48 hours. The length of time which is employed will depend on the steroid which is being transformed. Any water-miscible, non-toxic (to the organism) solvent may be employed to dissolve or suspend the steroid prior to mixing with the culture. I prefer to use ethanol or acetone in such amounts that the final concentration of these solvents in the reaction mixture is no higher than about 7% and may amount to only traces; owing to evaporation, the final concentration of the organic solvent may even be practically zero.

Following the completion of the dehydrogenation process, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, simple recrystallizations from a suitable solvent of solvent mixture, such as acetone, methylene chloride, ethanol, acetone-hexane, methylene chloride-hexane, etc. affords the desired dienone in excellent yield and high state of purity.

The ester group at C–17 is introduced preferentially following the microbiological dehydrogenation. The tertiary 17β-hydroxyl group may be selectively acylated in the presence of the 11β-hydroxyl by heating with the appropriate carboxylic acid anhydride such as acetic, propionic, butyric, etc.

In an alternative procedure for the preparation of the compounds of the present invention, the appropriate C–21 steroid is degraded by the action of sodium bismuthate to the corresponding 17-ketosteroid which can then be ethinated in the conventional manner.

While the degradation of the C–21 steroids is customarily carried out in aqueous acetic acid solutions, other water-miscible fatty acids can be used in place of the acetic acid. The degradation of the side chain can also be accomplished by the use of lead tetraacetate, periodic acid or other equivalent mild oxidizing systems.

Alternatively the novel compounds of my invention may be prepared by direct ethination of a 9α-halogeno-1,4-androstadiene-3,17-dione. The 17-keto androstadiene is prepared as described in my co-pending applications Serial No. 585,975, filed May 21, 1956, and Serial No. 776,401, filed November 26, 1958, now Pat. No. 2,955,118.

The therapeutically active compounds of the present invention are preferably administered orally in the form of tablets containing the desired dosage of the therapeutic compounds of the present invention, for example, from about 10 to about 50 mg., mixed with solid carrier containing one or more of the usual ingredients, such as starch, sugar, gums, clays and the like.

The following examples are intended to illustrate the novel products herein disclosed and are not to be construed as limiting in any way the scope of the present invention.

This application is a continuation-in-part of my co-pending application Serial No. 585,975, filed May 21, 1956, now abandoned, which itself is a continuation-in-part of co-pending application, Serial No. 449,257, filed August 11, 1954, and application, Serial No. 481,279, filed January 11, 1955, now U.S. Patent No. 2,837,464.

EXAMPLE A

Purification technique

In the following examples where a mixed solvent is mentioned as a purification solvent, the technique is as follows:

The crude substance is dissolved in a minimum of the first solvent mentioned and the solution is heated to boiling. The second is then added slowly whereupon the lower boiling solvent boils off. The product is somewhat insoluble in the second, higher-boiling solvent and after cooling the mixture, it is removed by filtration.

EXAMPLE 1

9α-fluoro-17α-ethinyl-1,4-androstadiene-11β,17β-diol-3-one

A. *9β,11β-oxido-4-pregnene-17α-21-diol-3,20-dione.*—10 g. of 9β,11β-oxido-4-pregnene-17α,21-diol-3,20-dione 21-acetate, of Fried and Sabo, J.A.C.S., 75, 2273 (1953), is dissolved in 1 liter of methanol. Nitrogen gas bubbled through the solution, and a solution of 1.5 g. of sodium hydroxide in 15 ml. of water is added. The resulting solution is stirred for 30 minutes, neutralized with acetic acid and concentrated in vacuo while adding water. The precipitate is collected and crystallized from acetone-methanol to give the desired product.

B. *9β,11β-oxido-4-androstene-3,17-dione.*—7.5 g. of the oxido intermediate from part A is dissolved in 1.0 liter of acetic acid with warming, and 1.0 liter of water is added. 135 g. of sodium bismuthate is then added and the mixture is stirred overnight at room temperature. The solids are filtered off and washed with methylene chloride. The mother liquor is diluted further with water and extracted with methylene chloride. The combined methylene chloride fractions are washed neutral with sodium bicarbonate solution and water, dried and evaporated to a residue. Crystallization from acetone-hexane yields 9β,11β-oxido-4-androstene-3,17-dione.

C. *3-pyrrolidino-9β,11β-oxido-3,5-androstadiene-17-one.*—5 g. of the product of part B is suspended in 20 ml. of methanol and nitrogen gas is passed through the displace air. The mixture is heated to reflux and methanol is added dropwise to effect complete solution. To the boiling solution there is added 1.8 g. of pyrrolidine and the solution is boiled until crystals appear (about 5 minutes). The mixture is then chilled and filtered and the filtrate washed with cold methanol and dried in vacuo yielding the pyrrolidino intermediate of sufficient purity to carry out the next step.

D. *17-ethinyl-9β,11β-oxido-4-androstene-17β-ol-3-one.*—260 mg. of potassium is dissolved in 25 ml. of boiling redistilled t-amyl alcohol. This solution is added dropwise with stirring at room temperature to a solution of 150 ml. of anhydrous ether saturated with acetylene. After five minutes of stirring, a solution in 150 ml. anhydrous ether of 2 g. of the pyrrolidino intermediate product from part C is added dropwise over one hour while acetylene is bubbled through the stirred mixture. Bubbling and stirring is continued for 2 hours. Dilute acetic acid is added cautiously and the mixture is boiled for 10 minutes and then extracted with ether. The ether solution is washed to neutrality with sodium bicarbonate solution and water, dried and evaporated. The residue is crystallized from acetone-methanol to give the above named intermediate.

E. *9α-fluoro-17-ethinyl-4-androstene-11β,17β-diol-3-one.*—0.5 g. of the product from part D is dissolved in 10 ml. of anhydrous methylene chloride, chilled to −30° and treated with a solution of 0.1 g. of hydrogen fluoride in methylene chloride. After 2 hours, the solution was washed with 5% aqueous sodium bicarbonate, dried and evaporated. The residue is crystallized from acetone-methanol to give the fluoro compound of this section.

F. *9α-fluoro-17α-ethinyl-1,4-androstadiene-11β,17β-diol-3-one.*—Bacillus sphaericus (A.T.C.C. 7055) is incubated on nutrient agar for 24 hours at 28° C. One loopful of the culture is then transferred to 100 ml. of sterile 1% yeast extract (Basamin—Busch) of pH 6.8. The inoculated culture is incubated on a shaking machine for 6 hours at 28° C. and the resultant broth culture is used as a standard inoculum at a level of 1 percent.

The standard inoculum is added to each of ten 300 ml. shake flasks containing respectively 100 ml. of 1% yeast extract at pH 6.8. At the end of 18 hours there is added to each flask 50 mg. of 9α-fluoro-17α-ethinyl-4-androstene-11β,17β-diol-3-one. The transformation proceeded rapidly and at the end of 24 hours, the contents of the remaining flasks were pooled and extracted exhaustively with a total of 3 liters of chloroform. The extracts were concentrated to a residue which recrystallized from acetone-methanol to give the product of this example.

EXAMPLE 2

9α-fluoro-17α-ethinyl-1,4-androstadiene-11β,17β-diol-3-one

In addition to the procedure described in Example 1, 9α-fluoro-17α-ethinyl-1,4-androstadiene-11β,17β-diol-3-one is prepared by the following transformations:

A. *1,4-androstadiene-11β-ol-3,17-dione.*—A solution of 1 g. of yeast extract (Difco) in one liter of tap water, the pH of which is adjusted to 6.9, is distributed among ten 300 ml. Erlenmeyer flasks and to each flask is added a loopful, 2 ml. of *Corynebacterium simplex*. The resulting suspensions are incubated at 30° C. on a shaking machine for 18 hours. 0.5 g. of 4-androstene-11β-ol-3,17-dione is dissolved in 25 ml. of acetone and the resulting solution is distributed equally among the ten flasks containing the 18 hours' growth of *Corynebacterium simplex*. The culture containing the 4-androstene-11β-ol-3,17-dione is then incubated at 30° C. for 24 hours. At the end of 24 hours, the contents of the flasks are combined and extracted with a total of 3 liters of chloroform. The crude chloroform extract from the transformation is concentrated to a residue which is crystallized from methylene chloride-hexane affording 0.35 g. of crystalline solid, M.P. 167–172° C. Recrystallization from the same solvent mixture afforded 1,4-androstadiene-11β-ol-3,17-dione, M.P. 176–179° C.

B. *1,4,9(11)-androstatriene-3,17-dione.*—93.5 g. of 1,4-androstadiene-11β-ol-3,17-dione (from 2A) is dissolved in 1100 ml. of dimethylformamide and 100 ml. pyridine. The mixture is cooled in 0° C. and 78.4 g. of methanesulfonyl chloride is added dropwise. The reaction mixture is stirred at room temperature overnight. (At 22 hours, paper chromatography shows reaction to be 98% complete.)

After stirring for 24–30 hours, the reaction mixture is diluted with water and extracted with three portions of methylene chloride. The combined methylene chloride extracts are washed with sodium bicarbonate and water and then concentrated to dryness in vacuo to yield 77 g. of crude product.

Purification is effected by recrystallization from acetone-hexane yielding 48 g. of pure 1,4,9(11)-androstatriene-3,17-dione, M.P. 164–167° C., [α] +104.2 (dioxane).

C. *9α-bromo-Δ¹,⁴-androstadiene-11β-ol-3,17-dione.*—
47 g. of 1,4,9(11)-androstatriene-3,17-dione (from 2B) is dissolved in 2.0 liters of tetrahydrofuran (previously purified by first standing overnight over potassium hydroxide pellets followed by distillation in the presence of lithium aluminum hydride) and 650 ml. of water. The reaction mixture is cooled in an ice bath and 65 g. of N-bromoacetamide is added followed by the dropwise addition of 650 ml. 0.1 N-perchloric acid. The reaction is stirred at room temperature for 24 hours.

The reaction mixture is then treated with sodium sulfite to destroy excess N-bromoacetamide; diluted with water and extracted with methylene chloride. The methylene chloride extract is washed with sodium bicarbonate and water, dried with magnesium sulfate and concentrated to dryness in vacuo to yield the crude product as a yellow solid. Crystallization from acetone-hexane affords 43 g. of pure bromohydrin, M.P. 171–173° C. dec., [α] +132.3 (dioxane).

D. *9β,11β-oxido-Δ¹,⁴-androstadiene-3,17-dione.*—41 g. of 9α-bromo-11β-hydroxy-1,4-androstadiene-3,17-dione is dissolved in 2.0 liters of acetone and refluxed with 100 g. anhydrous potassium acetate.

After 17 hours, the reaction mixture is concentrated to dryness in vacuo. The residual solid is extracted with methylene chloride to yield 32 g. of crude product which upon crystallization from acetone-hexane affords 27 g. of the pure epoxide of this example; M.P. 164–165° C., [α] +83.6° (dioxane).

E. *9α-fluoro-1,4-androstadiene-11β-ol-3,17-dione.*—25 g. of 9β,11β-oxido-1,4-androstadiene-3,17-dione is dissolved in 75 ml. of methylene chloride in a polyethylene bottle. 100 ml. of 48% aqueous hydrogen fluoride is added and the two-phase system is stirred with high speed agitation.

After 16 hours the reaction mixture is added to a saturated aqueous solution of sodium bicarbonate and extracted with methylene chloride. The methylene chloride extract is washed with water and concentrated in vacuo to yield 28 g. of crude fluorohydrin.

The crude product is purified by crystallization from acetone-hexane yielding 13.9 g. of the fluorohydrin of this example, M.P. 252–253° C. dec., [α] +113.6 (dioxane).

Alternatively, this compound may be prepared as follows:

1.91 g. of 9α-fluoro-1,4-pregnadiene-11β,17α,21-triol-3,20-dione is dissolved in 250 ml. of acetic acid with warming, and 250 ml. of water is added. 36 g. of sodium bismuthate is then added and the mixture is stirred overnight at room temperature. The solid is filtered off and washed with methylene chloride. The mother liquor is diluted further with water and extracted with methylene chloride. The organic layer is washed neutral with sodium bicarbonate solution and water, dried and evaporated to a residue. Crystallization from methylene chloride-hexane gave the desired product.

F. *9α-fluoro-17α-ethinyl-1,4-androstadiene-11β,17β-diol-3-one.*—In a 1 liter flask, equipped with a large Dry-Ice condenser, magnetic stirrer and gas inlet tube, insulated with glass wool, is placed about 300 ml. of ammonia. Sulfuric acid washed acetylene is bubbled in with stirring for 35 minutes, then, while acetylene addition is continued, 250 mg. sodium metal is added in several pieces. After 25 minutes 1.0 g. of 9α-fluoro-Δ¹,⁴-androstadiene-11β-ol-3,17-dione in 15 ml. of dry tetrahydrofuran is added dropwise. The mixture is stirred under acetylene for 4 hours, then 100 ml. of ethyl ether and 100 ml. of tetrahydrofuran are added and the solvent is allowed to evaporate at room temperature overnight. Ethyl ether and water are added and the mixture slightly acidified with hydrochloric acid. The mixture is extracted with ether and the combined extracts washed with water, dried, and concentrated. Addition of ether and acetone gives crystalline material which is recrystallized from acetone-hexane to yield the compound of this example, M.P. 274–279° d.,

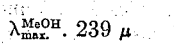

$\epsilon = 14,800$, [α]$_D$ +4.4° (dioxane).

The 17-monoacetate of the compound of this example is prepared by heating the substance in acetic anhydride on a steam bath for several hours, cooling, diluting with water and filtering. The 17-monoacetate is purified by recrystallization from acetone-hexane. In similar fashion other esters such as the propionate, butyrate are prepared.

EXAMPLE 3

*9α-fluoro-17α-ethinyl-1,4-androstadiene-17β-ol-3,11-dione*

300 mg. 9α-fluoro-17α-ethinyl-11β,17β-diol-3-one androstadiene is dissolved in 10 ml. of pyridine which is added to 120 mg. of chromium trioxide in 10 ml. of pyridine. The reaction mixture is allowed to stand at room temperature for 5 hours.

The mixture is poured into water and extracted with methylene chloride. The combined methylene chloride extracts are washed with dilute sulfuric acid and water and concentrated to dryness in vacuo to a residue. The residue is purified by crystallization from acetone-hexane yielding the fluoro ketone of this example.

EXAMPLE 4

*9α-bromo-17α-ethinyl-1,4-androstadiene-11β,17β-diol-3-one*

By substituting an equivalent quantity of 9α-bromo-1,4-androstadiene-11β-ol-3,17-dione (prepared as described in Example 2C) for 9α-fluoro-1,4-androstadiene-11β-ol-3,17-dione in Example 2F, there is obtained the corresponding bromo diene of this example. Purification is effected by recrystallization from acetone-hexane.

EXAMPLE 5

*9α-chloro-17α-ethinyl-1,4-androstadiene-11β,17β-diol-3-one*

A. *9α-chloro-Δ¹,⁴-androstadiene-11β-ol-3,17-dione.*—2 g. of 9β,11β-oxido-Δ¹,⁴-androstadiene-3,17-dione (prepared as described in Example 2D) is dissolved in 6 ml. of methylene chloride and agitated with 6 ml. of concentrated hydrochloric acid.

After 20 hours the reaction mixture is diluted with water and extracted with methylene chloride. The methylene chloride solution is washed with sodium bicarbonate and water and concentrated to dryness in vacuo. The residue is crystallized from acetone-hexane yielding the purified chlorohydrin, M.P. 238.0–238.5° C. dec., [α] +139.6 (dioxane).

B. *9α-chloro-17α-ethinyl-1,4-androstadiene-11β,17β-diol-3-one.*—By substituting an equivalent quantity of 9α-chloro-1,4-androstadiene-11β-ol-3,17-dione (prepared as described in Example 2C) for 9α-fluoro-1,4-androstadiene-11β-ol-3,17-dione in Example 2F, the above identified androstadiene is obtained.

EXAMPLE 6

9α-bromo-17α-ethinyl-1,4-androstadiene-17β-ol-3,11-dione

Treating the compound of Example 4 to the oxidative procedure of Example 3, the above dione of this example is obtained. Similarly, starting with 9α-chloro-17α-ethinyl-1,4-androstadiene-11β,17β-diol-3-one. There is obtained 9α-chloro-17α-ethinyl-1,4-androstadiene-17β-ol-3,11-dione.

By substituting an alkylated acetylene in the foregoing examples, the corresponding alkyne compound is obtained. For example, in the procedure of Example 1D, replacing acetylene by methylacetylene ultimately gives rise to 9α-fluoro-17α-propargyl-1,4-androstadiene,11β,17β-diol-3-one.

In similar fashion, the 17α-propargyl analogs of the compounds of Examples 3, 4, 5 and 6 are prepared.

Esterification discussed in Example 2F is also applicable to the preparation of other alkanoic esters such as the hemisuccinate and the dehydrogen phosphate. These esters are especially useful in the formation of water soluble preparations by virtue of the fact that sodium salts of the partial esters can be prepared in the conventional manner.

An ultimate procedure for the preparation of compounds of this invention is to alkynate the oxido compound of Example 2D giving rise to 9β,11β-oxido-17α-ethinyl-1,4-androstadiene-17β-ol-3-one. Opening the epoxide ring, as described in Example 2, yields the final product of this invention.

I claim:

1. Compounds of the group consisting of 9α-Y-11X-17α-lower alkynyl-1,4-androstadiene-17β-ol-3-ones wherein X is a member of the group consisting of O and (H, βOH) and Y is a halogen having an atomic weight less than 100.

2. Compounds of the group consisting of 9α-Y-17α-lower alkynyl-1,4-androstadiene - 11β,17β - diol - 3 - ones wherein Y is a halogen having an atomic weight less than 100.

3. Compounds of the group consisting of 9α-Y-17α-lower alkynyl-1,4-androstadiene-17β-ol-3,11-diones wherein Y is a halogen having an atomic weight less than 100.

4. 9α-fluoro-17α-ethinyl-1,4-androstadiene-11β,17β-diol-3-one.

5. 9α-fluoro-17α-ethinyl-1,4-androstadiene-17β-ol-3,11-dione.

6. 9α-bromo-17α-ethinyl-1,4-androstadiene-11β,17β-diol-3-one.

7. 9α-chloro-17α-ethinyl-1,4-androstadiene-11β,17β-diol-3-one.

8. 9α-bromo-17α-ethinyl-1,4-androstadiene-17β-ol-3,11-dione.

9. 9α-chloro-17α-ethinyl-1,4-androstadiene-17β-ol-3,11-dione.

10. 9β,11β-oxido-17α-ethinyl-1,4-androstadiene-17β-ol-3-one.

References Cited in the file of this patent

UNITED STATES PATENTS

| | | |
|---|---|---|
| 2,793,218 | Herr | May 21, 1957 |
| 2,816,121 | Gould et al. | Dec. 10, 1957 |
| 2,845,381 | Tindall | July 29, 1958 |